Figure 1:
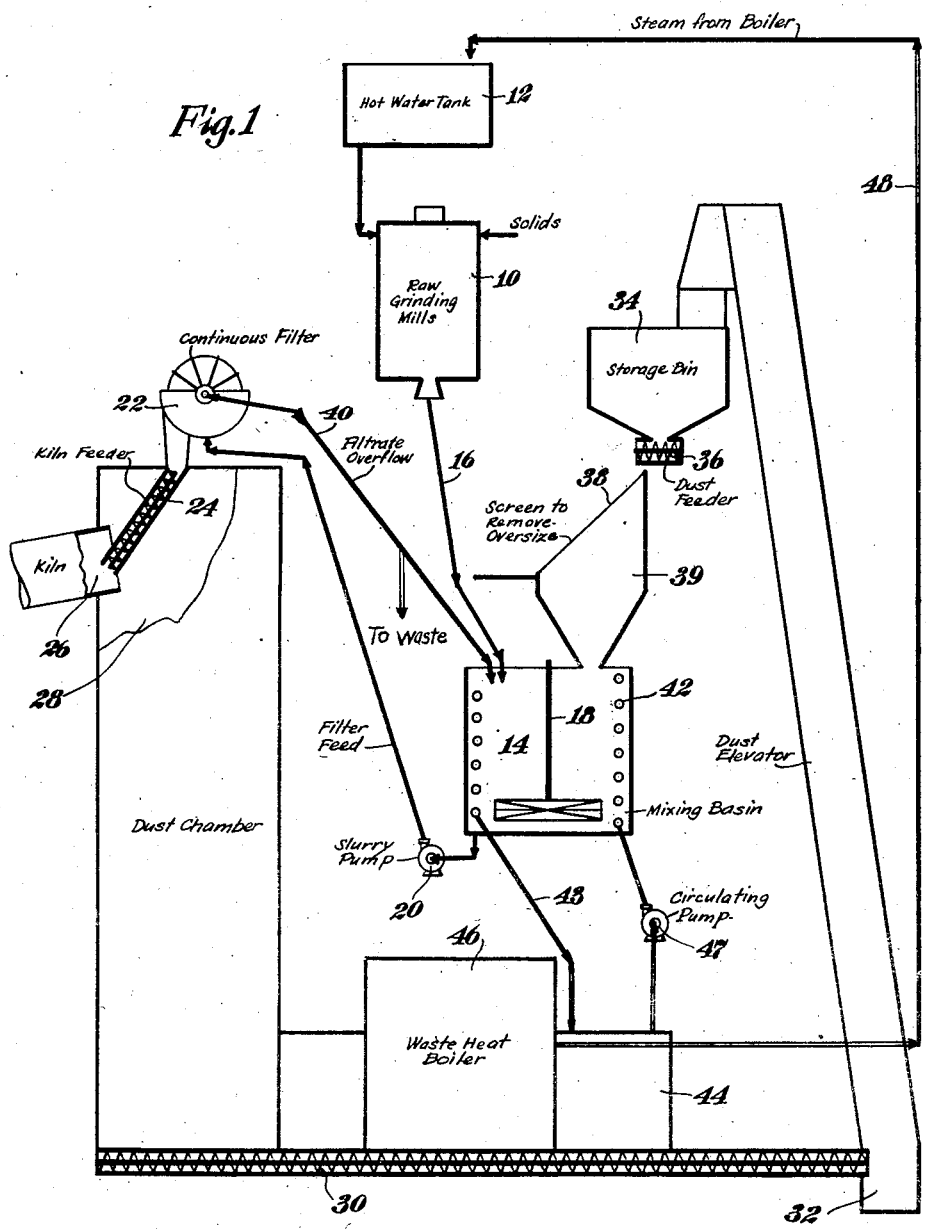

July 4, 1933.  D. C. COULSON  1,916,417
APPARATUS AND PROCESS FOR MAKING CEMENT
Filed June 29, 1928  2 Sheets-Sheet 1

INVENTOR
Donald C. Coulson
BY
ATTORNEYS

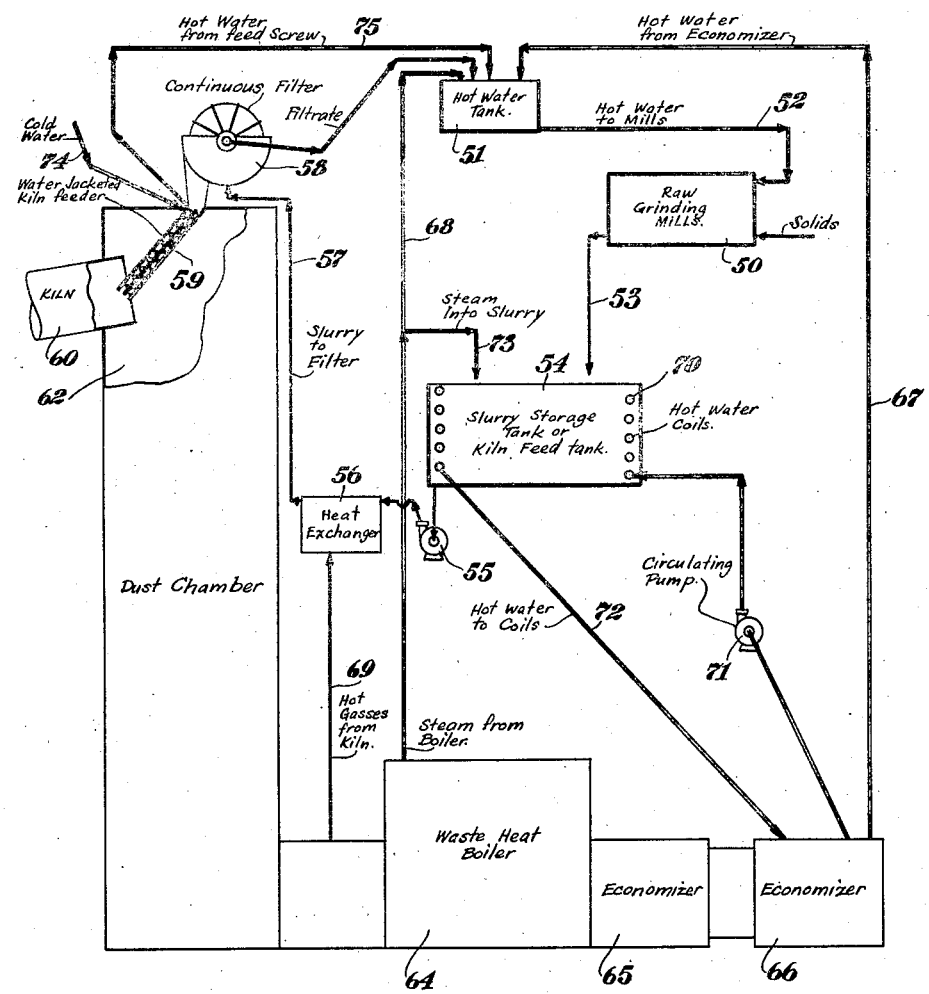

Patented July 4, 1933

1,916,417

UNITED STATES PATENT OFFICE

DONALD C. COULSON, OF CHICAGO, ILLINOIS, ASSIGNOR, BY MESNE ASSIGNMENTS, TO OLIVER UNITED FILTERS, INC., OF SAN FRANCISCO, CALIFORNIA, A CORPORATION OF NEVADA

APPARATUS AND PROCESS FOR MAKING CEMENT

Application filed June 29, 1928. Serial No. 289,297.

This invention relates to improvements in a part of the process employed in the formation of cement by the so-called wet process and particularly relates to the treatment of the cement slurry before it is fed into the firing kiln.

The principal object of this invention is to provide greater capacity and a more efficient method and means for producing cement by the so-called wet process whereby the usually wasted flue dust and kiln heat may be conserved and reused.

A further object of this invention is to provide a means whereby the capacity of a continuous filter, which is used between the slurry reservoir and the firing kiln to remove the water and conserve the heat necessary to burn the material, is greatly increased.

It is another object of this invention to provide means for conserving the flue dust which is ordinarily lost and wasted in the wet process for making cement and returning it back into the system.

It is still another object of the invention to provide a process for conserving flue dust and reintroducing it into the wet process system between the slurry reservoir and the continuous filters to increase the capacity of the filters without substantial loss and without serious operating difficulties.

It is still another object of this invention to provide a process whereby the slurry fed into a continuous filter is heated by the waste heat available in a cement plant in order to greatly facilitate the removal of moisture from the slurry and thereby increasing the capacity of the plant.

It is still another object of this invention to provide a process whereby the filtration capacity of a continuous filter interposed between the slurry reservoir and the firing kiln may be greatly increased by the conservation of flue dust and the use of normally wasted heat from the kiln.

Further objects and advantages of the process will appear from the following disclosure together with the attached drawings diagrammatically illustrating preferred forms of embodiment thereof, and in which Fig. 1 is a diagrammatic layout of a part of a cement mill showing the manner in which flue dust may be reclaimed and returned to the system and in which the slurry may be heated, and Fig. 2 is a diagrammatic layout of a modified form of the process showing the plurality of points from which waste heat may be taken for increasing the capacity of the filter.

The so-called wet process of making hydraulic cement fundamentally comprises the introduction of the certain necessary raw materials into a raw grinding mill 10, together with water from a tank 12 which, according to this process, is preferably hot water. After the customary grinding and regrinding the mixture with the water a slurry is formed which is passed into the mixing basin 14, through the conduit 16. This mixing basin is provided with an agitator or paddle 18, which may be continuously revolved by any desirable means (not shown). From the mixing basin or tank 14, the slurry is then pumped by the slurry pump 20 into the mud drum of a continuous filter 22. The process is more clearly shown and claimed in the application of Oliver and Vallet, Serial No. 215,794, filed Aug. 27, 1927.

As described in said application, the use of a continuous filter of either the pressure or vacuum type and either a drum or disc filter materially improves the efficiency of the cement plant makes economical the use of wet grinding and permits the use of excess quantities of water in the slurry which water should be removed immediately prior to firing to make the final cake which is passed into the kiln and providing a more uniform product. This is more particularly due to the method of operation of continuous filters which is well known in commercial practice and does not form a part of this invention.

The present invention effects further economies in the process and as shown herein the discharge from the continuous filter 22 is fed by a kiln feeder 24 into the kiln 26, it being understood that the moisture has been sufficiently reduced by the filter so that a substantially dry cake is discharged for clinkering. The upper end of the kiln 26 opens into a dust chamber 28 which receives the gas and the dust caused by the burning of the cement cake and this dust collects in the dust chamber or chambers where it will drop into the screw conveyor 30 or other suitable device to be removed. With the present processes of mixing cement, the dust that collects may amount to considerable, averaging from 19 to 37 tons for each 1,000 barrels of cement made, and in many instances this is entirely wasted. The screw conveyor 30 conveys the collected flue dust to the dust elevator 32 by which it is lifted to a hopper 34.

During operation, the dust is fed by means of an adjustable feeder 36 onto a vibrating screen 38 which is advantageously of ⅛ mesh. This removes the oversize dust and stray particles allowing the final dust to pass into the hopper 39, and then into the mixing basin or tank 14 to be mixed with the wet slurry. The flue dust which is recovered from the dust chamber is introduced into the mixing basin which is provided with the necessary agitator to prevent settling and to insure an intimate mix with the slurry from the grinding mill, it will be understood, however, that this dust may be introduced at any other point in the process and intimately mixed with the slurry or introduced in the raw mill. The excess water present also prevents the tendency of the slurry and dust to set and additional water may be added if desired. This excess water may desirably be drawn from the continuous filter 22 through the conduit 40. The introduction of the recovered flue dust into the slurry before the slurry passes through the filter, increases the filter capacity and prevents clogging of the filter cloth or other difficulties in the reservoirs.

It has been found in practice that adding the flue dust into the filter material not only leads to the recovery of the flue dust itself but also increases the capacity of the filter not uncommonly from 65 to 100% due to the peculiar action of the flue dust. It is sometimes necessary, however, to increase the moisture content from 1 to 2%, but in view of the fact that the capacity of the filter is so greatly increased, the slight increase of water contained is more than offset thereby.

The reason for this peculiar effect of the flue dust on the filter capacity is not known but it has been found that the effects do result. One explanation is that cement slurry is made up of solids and a liquid, the solids ranging from those that will pass through 200 mesh screening on down to the colloidal material. The colloidal material retards the filtration rate but is flocculated by some chemical reagents whereby the filtration rate is increased. The reagents which cause flocculation are the soluble salts which form an electrolyte in solution in water and which tend to regulate the hydrogen-ion content of the solution.

The flue dust which is essentially the solid part of cement slurry, which has been heated to a point of calcination, has changed from calcium carbonate to calcium oxide and this calcium oxide will dissolve in water, cause flocculation and bring about the effects as mentioned above, giving a greater filtration rate.

I have also found that the rate of filtration is further increased by heating the slurry by introducing steam or hot water coil 42 into mixing tank 14 to decrease the viscosity of the slurry fed to the filter, this coil receives hot water from the economizer 44 attached to the waste heat boiler 46 adjacent the dust chamber 28. The circulation pump 47 is used to insure a rapid exchange of heat.

The slurry may, however, be heated in many different ways from the waste heat of the cement mill, as for example: Steam may be taken from the waste heat boiler 46 through the conduit 48 and introduced into the hot water tank 12 to increase the temperature of the slurry mixture and to introduce hot slurry into the filter. This heat is not only conserved by its introduction to the slurry, but the hot slurry also increases the capacity of the filter and tends to reduce the moisture of the filter cake.

It will thus be noted that the previous difficulties of adding flue dust to the slurry which caused premature setting or which was heretofore added to the feed of the kiln, and which was very difficult to control and frequently caused mud rings, have been obviated by the introduction of the flue dust into the slurry mixing basin having an excess of water present. It is possible to satisfactorily operate with an excess of water when a continuous filter is used because such a filter is not particularly effected by the previous amount of water present. In other words, no matter how much water is used to prevent the flue dust from premature setting in the mixing chamber, a uniform cake may be formed having the least amount of moisture therein possible in the proper continuous filter. The addition of the flue dust materially adds to the efficiency of the filter as before mentioned doubling the ordinary capacity and in addition valuable cement making material is recovered in the dust. The increase in temperature in the slurry not only counteracts the disadvantage of the small increase in moisture necessary because of the flue dust but further increases the capacity of the filter. This material improvement is brought about by the conservation of the heat and flue dust which are always present in cement making plants and which have been heretofore wasted.

A slightly modified form of the device is shown in Fig. 2 in which raw grinding mills 50, which receive and grind the necessary solid raw materials to the requisite fineness, receive hot water from the tank 51 through the conduits 52. The slurry is then forced through the conduit 53 into the slurry storage tank or kiln feed tank 54 from which it is pumped through the slurry pump 55, through heat exchanger 56 and conduit 57 to the bottom of a continuous filter 58. This filter discharges through the water jacketed screw kiln feeder 59, into the kiln 60, opening into the dust chamber 62 which is provided with a waste heat boiler 64 and economizers 65 and 66. The hot water is tapped from either or both of the economizers 65 and 66 by the conduit 67 and is introduced into the hot water tank. Steam may also be tapped from the waste heat boiler 64 and be introduced into the hot water tank 51 by the conduit 68. The heat exchanger 56 receives its heat from the excess heat of the kiln through the necessary conduit 69.

In addition to the hot water which is mixed with the slurry, it may also be desirable to keep the slurry in a warm condition by the necessary hot water coils 70 in the slurry tank 54 which are supplied with hot water from the economizer which is pumped through the circulating pump 71 and conduits 72 through the coils. It is also possible to introduce steam from the waste heat boiler 64 through the conduit 68 and the conduit 73 into the slurry tank.

A further source of heat is a water jacketed kiln feed screw 59 which receives cold water through the conduit 74 and discharges hot water through the conduit 75 which may also preferably be introduced into the hot water tank. The remaining sources of hot water or steam are only suggestive and it is obvious that in a cement plant there are many sources of heat otherwise wasted, available. By using this waste heat to heat the slurry, it is possible to form a drier cake and increase the filter capacity and this reduction in the moisture of the cake will also cause a greater kiln output with less fuel. The filtrate from the filter may also be discharged into the hot water tank thereby conserving the possible slurry or cement particles and substantially preventing loss of any of the raw materials which actually enter the mill.

It will thus be seen that the process disclosed provides for the introduction of flue dust or other reagent having similar effects to the mixture at any time during the process, but is preferably introduced into the slurry or in the raw grinding mill before passing through the continuous filters. In such cases the capacity of the filter may be increased one hundred per cent or more. When the flue dust is added anywhere in the system as, for example, in the kiln feed, the kiln capacity is increased, the flue dust is advantageously used, and a more uniform cement is produced. The flue dust is the normally wasted product of the cement plant.

A second feature of the process is that the slurry is preferably heated by the surplus or waste heat of the cement plant, and this increase in slurry temperature also increases the capacity of the filters and the cement kiln and furthermore, counteracts the slight increase in moisture required when the flue dust is added. It is to be understood that the slurry may be heated directly or indirectly by many means, and either or both of the two steps of the process may be used, as desired.

While I have shown preferred forms of embodiment of this process, it is understood that many modifications may be made therein, and I desire a broad interpretation of my invention within the spirit and scope of the disclosure and the claims appended hereto.

I claim:

1. In a process for making cement by the wet process, with the aid of a continuous filter the method of increasing the filtering capacity by adding flue dust to the slurry and subsequently passing said slurry through a continuous filter.

2. In a process for making cement by the wet process, the method of increasing the filtration capacity which comprises adding flue dust to the slurry adding additional water to improve fluidity of the mixture and subsequently passing said slurry through a continuous filter.

3. The combination in a wet grinding cement mill having a continuous filter for reducing the moisture content of the ground slurry before it is fed into the furnace, of a dust collector for recovering flue dust from the kiln, a dust feeder to introduce said flue dust into the slurry, and a conduit and pump for passing the slurry and flue dust to a continuous filter for dewatering.

4. The process of forming cement by wet grinding which comprises grinding the solid materials with water to form a slurry, flocculating the slurry by adding flue dust thereto, filtering the flue dust and slurry in a continuous filter and feeding the filter cake to the kiln.

5. The combination in a wet grinding cement mill having a continuous filter for reducing the moisture content of the ground slurry before it is fed into the furnace, of a dust collector for collecting flue dust from said furnace, a conveyor for introducing flue dust into the slurry, a mixing tank for mixing said slurry and dust, heated conduits heated by waste heat from said furnace, and pump means to pump said slurry through said conduits to counteract the increase in moisture effect due to the addition of the flue dust.

6. The process of making raw cement mix which comprises grinding the raw materials with an excess of water, adding flue dust to the slurry thus formed, heating the slurry and passing the heated slurry into continuous filters.

7. The process of forming cement by wet grinding which comprises grinding the solid material with water to form a slurry, adding flue dust to the slurry, heating the flue dust and slurry mixture to increase the filtering capacity, filtering the flue dust and slurry in a continuous filter and feeding the filter cake to the kiln.

8. The method of handling cement slurry in a wet grinding cement mill which comprises adding flue dust to the slurry, heating the slurry with waste heat and subsequently passing the slurry through a continuous filter.

9. The method of forming cement by a wet grinding process which comprises grinding solid constituents with hot water to form a slurry, heating the slurry, recovering flue dust from the kiln, adding flue dust to the slurry before filtration to increase filtering capacity, and passing the slurry through a continuous filter to dewater the same, and feeding the filter cake to the kiln.

In testimony whereof I have affixed my signature to this specification.

DONALD C. COULSON.